United States Patent
Neelen

[15] 3,667,348
[45] June 6, 1972

[54] SEALS BETWEEN COAXIAL ELEMENTS

[72] Inventor: Gregorius Theodorus Maria Neelen, Emmasingel, Eindhoven, Netherlands

[73] Assignee: U.S. Philips Corporation, New York, N.Y.

[22] Filed: Apr. 1, 1970

[21] Appl. No.: 24,506

[30] Foreign Application Priority Data

Apr. 17, 1969 Netherlands.....................6905901

[52] U.S. Cl......................................................92/83, 60/24
[51] Int. Cl............................................................F15b 21/04
[58] Field of Search..................92/83, 85, 86, 99, 98, 98 RD; 60/24

[56] References Cited

UNITED STATES PATENTS

| | | | |
|---|---|---|---|
| 3,272,089 | 9/1966 | Rietdijk | 92/99 X |
| 3,277,795 | 10/1966 | Rietdijk | 92/99 X |
| 3,302,392 | 2/1967 | Fokker et al. | 92/98 X |
| 3,364,675 | 1/1968 | Dorer | 92/85 X |
| 3,492,813 | 2/1970 | Meijer | 92/83 |
| 3,546,877 | 12/1970 | Van Beukering et al. | 60/24 |
| 3,547,005 | 12/1970 | Van der Aa | 92/83 |

Primary Examiner—Martin P. Schwadron
Assistant Examiner—Leslie J. Payne
Attorney—Frank R. Trifari

[57] ABSTRACT

An apparatus such as a hot gas engine and a compressor has a rolling diaphragm seal between adjacent walls of a piston and cylinder and supported by a liquid, and has an additional piston ring seal between the diaphragm seal and gas space above, this ring seal having an operative diameter equal to the effective diameter of the diaphragm seal for maintaining constant the volume above said diaphragm seal.

11 Claims, 6 Drawing Figures

INVENTOR.
GREGORIUS T. M. NEELEN 3,667,348

SEALS BETWEEN COAXIAL ELEMENTS

BACKGROUND OF THE INVENTION

The invention relates to a device comprising two coaxially arranged elements which are movable relative to one another, such as a piston and a cylinder, or a rod and a surrounding housing, with at least one rolling diaphragm secured between these elements; the seal separates a first space from a second space, the first space containing a gas and the second space containing a liquid to support the rolling diapragm, and a control device is present to maintain an at least substantially constant pressure differential across the rolling diaphragm.

Devices of the above-described type are known, as disclosed in the French Pat. specification No. 1,326,063, and are formed, for example, by hot-gas piston engines, cold-gas refrigerators, and compressors. In these devices, the gas-filled first space usually is the working space, but it may also be the buffer space as is the case in a hot-gas piston engine of the displacer type. The rolling diaphragm is present to prevent the gas from leaking away from the working space, and to prevent contaminations, such as, lubricating oil, from reaching the working space.

Liquid (lubricating oil) can be supplied to the second space, the liquid space, by pumping means, with the control device ensuring that the amount of liquid removed from the liquid space is such that (a) in the case of a rolling diaphragm which faces the gas space with its concave side, the pressure differential across the rolling diaphragm does not fall below a given minimum value and, (b) in the case of a rolling diaphragm which faces the gas space with its convex side, said pressure differential does not exceed a given maximum value. In such devices, the pumping means are usually coupled directly to the shaft of the device, which means that only during operation of the device is liquid supplied to the liquid space. In the stationary condition of the device, some liquid always leaks away from the liquid space. As a consequence the device cannot directly be started at the desirable operating pressure, because it is desirable to prevent the pressure differential across the rolling diaphragm from reaching a value in the support of said rolling diaphragm which is insufficient due to the lack of liquid. In the case of a rolling diaphragm which faces the gas-filled space with its concave side, the pressure differential may then be so large that the rolling diaphragm becomes too greatly stretched and is destroyed as a result; in the case of a rolling diaphragm which faces the gas face with its convex side, the pressure differential can be so small, that the rolling diaphragm is no longer stretched and is destroyed as a result of the formation of pleats.

Not only upon starting but also during operation of the device, is it possible that by some cause, such as a disturbed supply of liquid, insufficient liquid is present in the liquid space. The rolling diaphragm is then subjected to the large and rapid pressure variations in the working space, as a result of which it can be destroyed, again due to the above-mentioned reasons. It is to be noted that in the published Dutch Pat. No. 6,603,707, it has already been proposed to supplement an additional quantity of medium to the liquid space when the pressure differential across the rolling diaphragm differs in an inadmissible manner from the nominal value as a result of a shortage of liquid in the liquid space. However, special structural precautions are required for this purpose which make the device comparatively expensive and complicated.

The large and rapid pressure variations in the working space also have an unfavorable influence on the lifetime of the rolling diaphragm, since always some diffusion of gas from the working space through the rolling diaphragm to the liquid space takes place, as a result of which the liquid becomes slightly compressible and no longer fulfils its supporting task. Moreover, in particular in compressors with high pressure ratio, high temperatures can occur in the working space as a result of the compression. As a result of this the rolling diaphragm will also be subjected to high temperatures which further reduces the lifetime of said diaphragm and causes the diffusion of gas from the working space through the diaphragm to increase.

This means that for the above-mentioned reasons, the rapid increase of the average gas pressure in the working space, as is used, for example, in hot-gas engines within the scope of the power control by means of gas suppletion will have an unfavorable influence on the lifetime of the rolling diaphragm. A further drawback of the known device is that the part of the working space which is situated above the rolling diaphragm does not contribute to the compression and expansion, respectively, and therefore forms a dead space.

It is the object of the invention to provide a device of the above-described type having one or more rolling diaphragms in which the drawbacks are mitigated in a simple manner. For that purpose the device according to the invention is characterized in that a seal is present between the coaxial elements on the side of the rolling diaphragm facing the first space, which seal separates a near portion of the first space adjoining the rolling diaphragm from the remote portion of said space, and which is operative on a diameter which is equal to the effective diameter of the rolling diaphragm.

The effective diameter of the rolling diaphragm is to be understood to mean herein, that sealing diameter which would have the same effect as the rolling diaphragm and which lies approximately centrally between the diameters of the surfaces along which the rolling diaphragm rolls.

In this manner a device is obtained in which the rolling diaphragm is safeguarded from the large pressure pulse which occurs in the working space upon starting the device and from the large and rapid pressure variations and high temperatures in the working space during operation. A shortage of liquid in the liquid space and/or the presence of liquid which is compressible as a result of the gas diffusion through the rolling diaphragm, now is substantially no longer of any significance. Since the rolling diaphragm remains cool, which is favorable for increasing its lifetime, the gas diffusion is also small. The dead space above the rolling diaphragm now forms no part of the working space, so that the volumetric efficiency hereof and the compression ratio are improved.

Since the diameter on which the seal is operative is equal to the effective diameter of the rolling diaphragm, the volume of the part of the first space adjoining the rolling diaphragm will remain at least substantially constant in the case of a relative movement of the two cooperating elements. This provides the advantage that the gas pressure above the rolling diaphragm also remains substantially constant per stroke. So in this space no compression and expansion, respectively, of the quantity of gas occurs, so that the rolling diaphragm not only feels a constant gas pressure, but also has a constant temperature, which again is favorable for longer lifetime.

A further advantage is obtained in that the control device is now commutated on the one side with the liquid space and on the other side with the space between the rolling diaphragm and the seal. The actual result is that the control device is also less subject to large pressure fluctuations, which reduces wear of moving components. In addition a less rapidly reacting control device will be sufficient, if desirable.

In a favorable embodiment of the device according to the invention, the seal is formed by one or more piston rings each included in a groove in the wall of one of the two elements. Although piston rings always show some leakage, the large and rapid pressure variations in the working space and buffer space, respectively, will not be felt in the space between the rolling diaphragm and the piston ring, in which space the average pressure will adjust which prevails in the working space and the buffer space, respectively.

In circumstances it may be of importance to have a pressure in the space between the rolling diaphragm and the seal which corresponds to the maximum or minimum pressure occurring in the working space. Maximum pressure in the relative space is desirable, for example, in the case in which the rolling diaphragm is present as a seal between the piston and the cylinder of a compressor having a suction pressure lower than the atmospheric pressure.

Minimum pressure in the relative space is of advantage in connection with the fact that in that case the pumping means which supply liquid to the liquid space, as well as the control device, are less heavily loaded. Actually, the pressure in the liquid space can then be reduced to an equal extent while maintaining the pressure differential present across the rolling diaphragm so that a smaller pumping action will do.

In order to have in the space between the rolling diaphragm and the piston ring during operation, the pressure adjusted to be at least substantially equal to the minimum or maximum pressure occurring in the remaining part of the first space, a favorable embodiment of the device according to the invention is characterized in that an open communication is always present between the space in the groove behind the piston ring and one of the two spaces separated by the piston ring.

In the case in which the continuously open communication is present between the space in the groove behind the piston ring and the part of the first space serving as a working space, a pressure will adjust, during operation of the device, in the space between the rolling diaphragm and the piston ring, which is at least substantially equal to the minimum pressure occurring in the working space, as a result of the fact that the piston ring seal permits flow of gas in the direction of the part of the first space serving as a working space.

When, however, the open communication is present between the space in the groove behind the piston ring and the space between the rolling diaphragm and the piston ring, the pressure which will adjust in the last-mentioned space will at least substantially be equal to the maximum pressure occurring in the working space, as a result of the fact that the piston ring seal now permits flow of gas in the opposite direction.

The open communication may be formed, for example, by providing the piston ring with radially extending grooves on a side which faces one of the two parts of the first space, or by providing an aperture in the piston and cylinder, respectively.

In a further favorable embodiment of the device according to the invention, the seal is formed by a narrow gap. The large and rapid pressure variations in the working space and buffer space, respectively, are not passed by this gap to the space above the rolling diaphragm. Only gas leak occurs, so that during operation of the device a pressure will adjust in the space above the rolling diaphragm which will be at least substantially equal to the average pressure occurring in the remaining part of the first space.

In order that the invention may be readily carried into effect, a few examples thereof will now be described in greater detail, with reference to the accompanying diagrammatic drawings which are not drawn to scale.

DESCRIPTION OF THE PREFERRED EMBODIMENT

Figure 1:
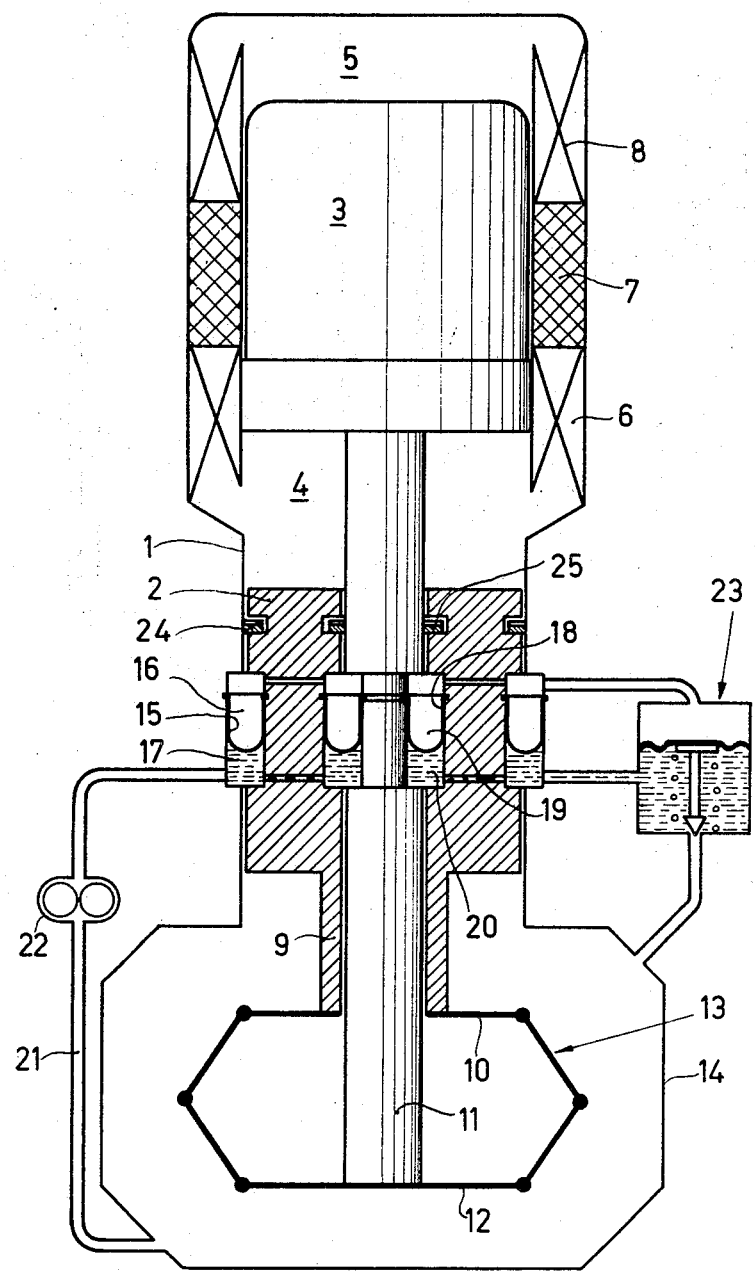
FIG. 1 is a cross-sectional view of a hot-gas engine of the displacer type, comprising rolling diaphragm seals in which the space within the rolling diaphragm is separated from the working space by a piston ring seal

Reference numeral 1 in FIG. 1 denotes a cylinder in which a piston 2 and a displacer 3 reciprocate. The working face of the piston varies the volume of a compression space 4, while the working face of the displacer varies the volume of the expansion space 5. These two spaces communicate with each other via a cooler 6, a regenerator 7 and a heater 8, and are filled with a working medium. The piston 2 is connected to a yoke 10 through a hollow piston rod 9, while the displacer 3 is secured to a yoke 12 through a displacer rod 11 which is passed through the piston and the hollow piston rod. The yokes 10 and 12 form part of a rhombic drive generally referred to by reference numeral 13 which is housed in a crank case 14 containing lubricating oil.

A rolling diaphragm 15 between the cylinder 1 and the piston 2 separates a space 16 filled with a working medium from a liquid space 17. Furthermore a rolling diaphragm 18 is present between the piston 2 and the displacer rod 11 which diaphragm separates a space 19 filled with working medium from a liquid space 20. The liquid space 17 is in open communication with the liquid space 20 while the gas space 16 communicates with the gas space 19. The rolling diaphragms ensure that working medium cannot reach the crank case and, conversely, lubricating oil from the crank case cannot pollute the compression space.

By means of a pumping device 22 incorporated in a liquid supply duct 21, lubricating oil can be transported from the crank case to the liquid spaces 17 and 20, for supporting the rolling diaphragms 15 and 18. Furthermore, a control device 23 is present which ensures that an amount of lubricating oil can always be removed from the liquid spaces 17 and 19 such that an at least substantially constant pressure differential prevails across the rolling diaphragms 15 and 18. Since the operation and construction of the rolling diaphragms and the control device are known, they need no further explanation here.

Piston rings 24 and 25, respectively, each incorporated in a groove in the piston wall, are present between the cylinder and piston walls and piston and displacer rod walls, respectively. These piston rings separate the gas spaces 16 and 19 from the compression space 4. Since the piston ring 24 is operative on a diameter which is equal to the effective diameter of the rolling diaphragm 15, the volume of gas space 16 will remain constant when the piston moves relative to the cylinder. Also, since the piston ring 25 is operative on a diameter which is equal to the effective diameter of the rolling diaphragm 18, the volume of the gas space 19 will not vary when the piston and displacer rods move relative to one another.

With this arrangement the rolling diaphragms 15 and 18 will now not be troubled by the pressure variations occurring in the compression space 4 upon starting, and during operation of the device, or in the case of a sudden increase of the pressure by gas suppletion for increasing the supplied axle power. The possibly occurring high temperatures in the compression space are not annoying either.

Since the spaces above the rolling diaphragms no longer form part of the compression space, the dead volume of the last-mentioned space is reduced and the volumetric efficiency and hence the compression ratio are improved.

Since the volume of gas spaces 16 and 19 does not vary in the case of a relative movement of the piston and the cylinder and the displacer rod, respectively, the gas pressure above the rolling diaphragm will remain constant even per stroke. The control device 21 will consequently be loaded considerably less than in prior art devices.

The upper sides of the piston rings 24 and 25 comprise radially extending grooves. As a result of this open communication is always present between the spaces in the grooves behind the piston rings, and the compression space 4, so that during operation of the device, gas leak will mainly occur from the spaces 16 and 19 to the compression space 4 thus operable as a one-way valve. As a result of this a, pressure will adjust in the spaces 16 and 19 which will be approximately equal to the minimum pressure occurring in the compression space 4.

Figure 2A:
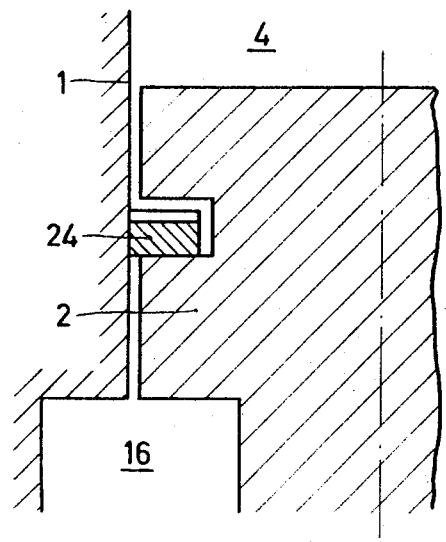
FIGS. 2a and 2b show the piston ring seal shown in FIG. 1 in detail and in two different positions of the piston ring in the associated groove.
Figure 2B:
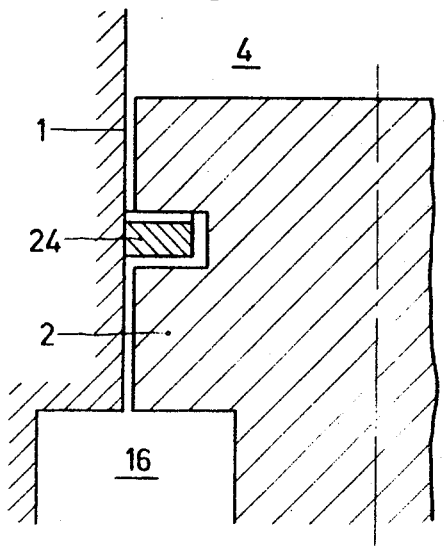

The above can easily be seen with reference to FIG. 2, in which a part of FIG. 1 is shown on an enlarged scale, namely for two different positions of piston ring 24 in the groove in the piston wall. When the pressure in the compression space 4 becomes larger than in the space 16, the piston ring 24 will be urged against the lower surface of the groove with its lower side and seal the space 16, not counting a small leak (FIG. 2a). When, however, the pressure in the compression space decreases and becomes lower than the pressure in the space 16, the upper side of the piston ring will engage the upper surface of the groove (FIG. 2b). However, working medium can always leak from the space 16 along the radially extending grooves on the upper side of the piston ring 24 to the compression space 4. As a result of this the pressure in the space 16 will be equal to the minimum pressure in the compression space 4.

Since a pressure which is lower than the pressure prevailing on an average in the compression space will prevail above the rolling diaphragm, the liquid pressure in the liquid space below the rolling diaphragm can also be minimum while maintaining the nominal pressure differential across the rolling diaphragm. This means that the pump 22 is less heavily loaded or that less powerful pumping means will do than in the case in which the rolling diaphragm feels the direct pressure of the working space. Of course, a pressure can also be adjusted in the spaces 16 and 19 which is substantially equal to the maximum pressure occurring in the compression space 4. This can be achieved by providing the radially extending grooves in the lower side instead of in the upper side of the piston rings 24 and 25.

The adjustment of maximum pressure can be of advantage in circumstances, for example, in compressors when medium of atmospheric pressure is sucked in the compression space. When in that case it is desirable to use a rolling diaphragm which faces the working space with its concave side, it is necessary, for keeping the rolling diaphragm stretched, to maintain for this purpose a pressure differential of a few atmospheres, for example, 5 atmospheres directed in the direction of the liquid. When the space within the rolling diaphragm is in open communication with the compression space, the rolling diaphragm at a given instant feels a pressure in the compression space which is lower than the desirable pressure differential across the rolling diaphragm. When the pressure in the compression space further decreases, the rolling diaphragm does no longer remain stretched in the desirable manner. This difficulty can now fully be obviated by adjusting the maximum pressure in the space within the rolling diaphragm in the above-described manner.

Figure 3A:
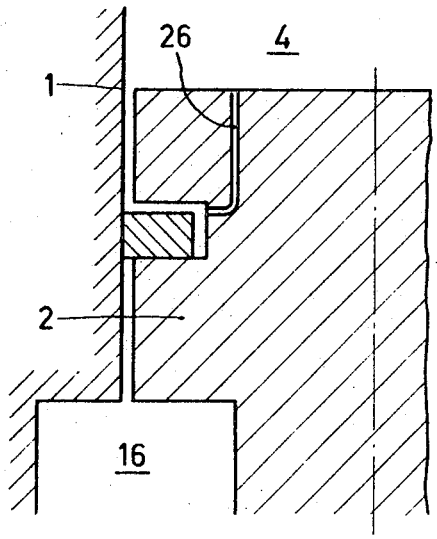
FIGS. 3a and 3b show another embodiment of a piston ring seal in two different positions of the piston ring in the groove.
Figure 3B:
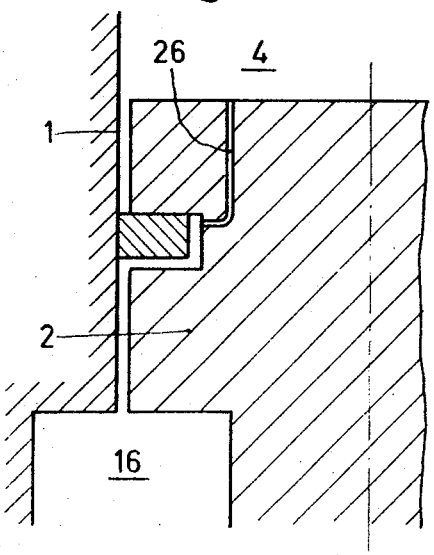

FIG. 3 shows that the open communication between the space in the groove behind the piston ring and the compression space (or spaces 16 and 19, respectively) can also be realized differently, namely by an aperture 26 in the piston. Both in the case in which the lower side of the piston ring engages the lower side of the groove (FIG. 3a) and in the case in which its upper side engages the upper side of the groove (FIG. 3b) is the open communication maintained between the space in the groove behind the piston ring and the upper space. As regards its operation, said seal fully corresponds to the seal shown in FIGS. 2a and 2b. Although in the drawing the piston rings are shown to be located in grooves in the cylinder wall it is alternatively possible to locate them in grooves in the cylinder and displacer rod wall, respectively, and to provide them with apertures.

Figure 4:
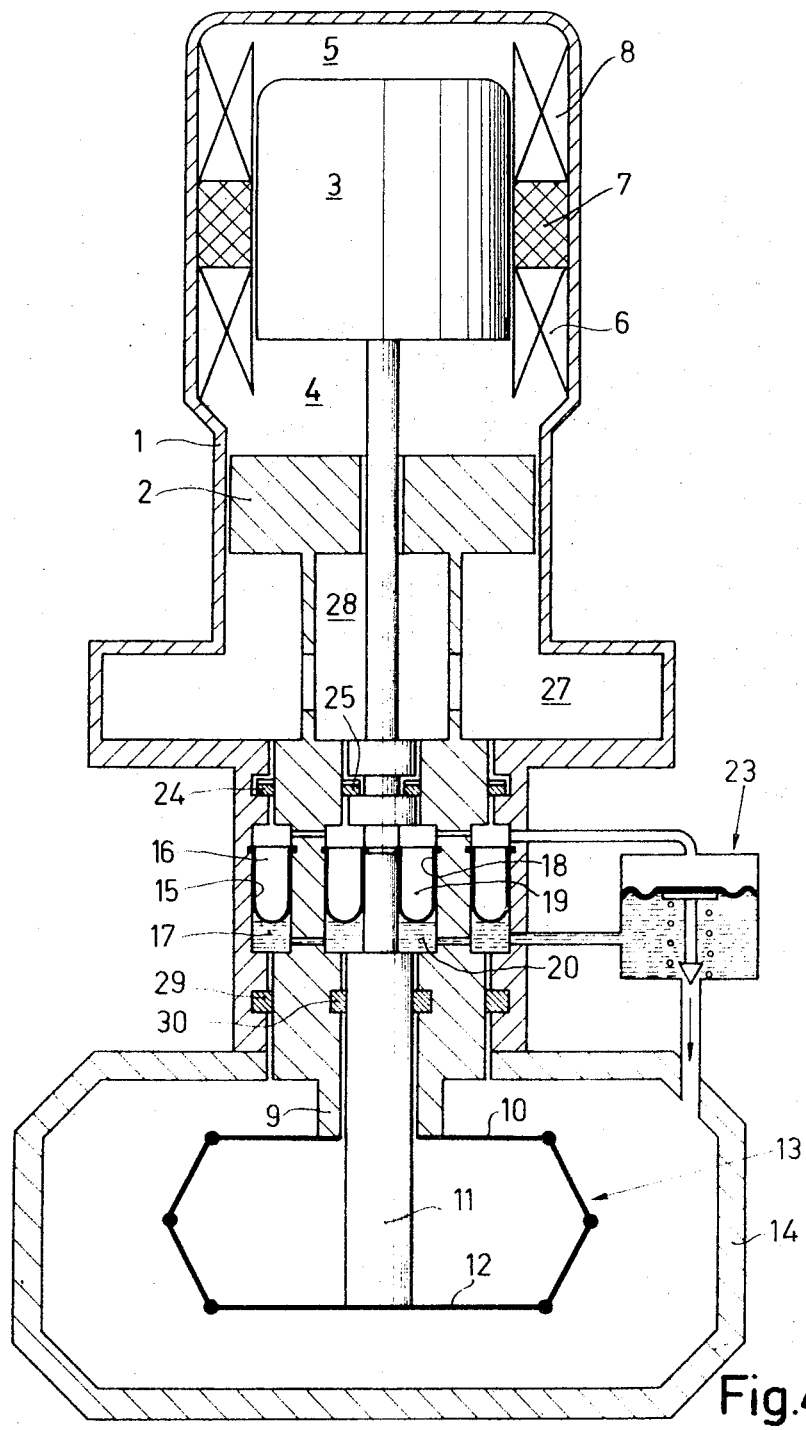
FIG. 4 is a cross-sectional view of a hot-gas engine of the displacer type with a buffer space between the crank case and the working space.

FIG. 4 shows another embodiment of a hot-gas engine of the displacer type in which like reference numerals are used for like components as in FIG. 1. The difference between this device and the device shown in FIG. 1 mainly consists in that between the compression space 4 and the crank case 14 a buffer space 27 is present which is filled with working medium of the same pressure as the working medium in the compression space, so that the pressure forces exerted on an average on the working face of the piston 2 by the medium in the compression space, are substantially compensated by the pressure forces exerted on an average on the lower surface of the piston by the medium in the buffer space.

The piston rings 24 and 25 are each accommodated in a groove in the cylinder wall and displacer rod wall, respectively, and separate spaces 16 and 19 from the buffer space 27 and from the space 28 in the piston rod which is in open communication herewith, respectively. In this case the rolling diaphragm will not be troubled by the pressure variations occurring in the buffer space upon movement of the piston 2 and the displacer rod 11. Therefore, a smaller buffer space will be sufficient because the pressure variations increased in value have no influence on the rolling diaphragm.

In this device lubricating oil is transported from the crank-case 14 to the liquid spaces 17 and 20, by means of pumping rings 29 and 30 between the piston and the cylinder and displacer rod, respectively. Otherwise the operation and construction of this device is identical to that shown in FIG. 1, so that it need not be further described.

Although all the rolling diaphragms in the drawing are shown in a position in which their concave sides face the gas space, it is of course equally readily possible to cause the rolling diaphragm to face the said gas space with their convex sides while maintaining the same advantages. Furthermore, the seal in the drawing between the space within the rolling diaphragm and the working space and the buffer space, respectively, is formed by only one piston ring. It will be obvious, however, that said seal may alternatively be constituted by several piston rings. In other circumstances the seal may also be formed by a narrow gap in which in the space within the rolling diaphragm, the average pressure will be that which prevails in the working space and buffer space, respectively.

From the above it will be obvious that the invention provides an extremely simple and efficacious solution to protect diaphragms from large and rapid pressure variations and high temperatures occurring in the gas-filled space in devices comprising rolling diaphragms between the piston and the cylinder and the rod and surrounding housing, respectively, which rolling diaphragms adjoin on one side a gas-filled space, for example, a working space or buffer space and on the other side are supported by liquid.

What is claimed is:

1. In an apparatus having two elements which are coaxially disposed and relatively movable, a rolling diaphragm which is secured between adjacent walls of these elements and defines and separates a first space for containing gas and a second space for containing liquid for supporting the diaphragm, and control means operative with said apparatus for maintaining at least a substantially constant pressure differential across the diaphragm, the improvement in combination therewith comprising a second seal between said elements and located axially between said diaphragm and said first space which is thus divided into near and remote portions of the first space relative to said diaphragm, the second seal being operative on a diameter which is equal to the effective diameter of the diaphragm.

2. Apparatus according to claim 1 wherein one of said adjacent walls has a circumferential groove therein, and said second seal comprises a piston ring incorporated in said groove.

3. Apparatus according to claim 2 wherein said groove and piston ring therein define an annular space therebetween which is always in open communication with one of said near and remote portions of said first space.

4. Apparatus according to claim 1 wherein said seal is formed by a narrow gap.

5. In a hot gas engine having a compression piston axially movable within a cylindrical housing and defining a compression space above the piston, at least one rolling diaphragm seal between said piston and housing for defining and separating a substantially constant volume gas space above said seal and a liquid space below the seal, and a liquid supply, the gas space in communication with said compression space and the liquid space in communication with said liquid supply, and means for maintaining a substantially constant pressure differential across said diaphragm, the improvement in combination therewith comprising: a second sealing means formed as a piston ring disposed between and engaging said piston and housing, this ring being disposed axially between said diaphragm and compression space and operable as a one-way valve therebetween, this ring having an operative diameter equal to the effective diameter of the diaphragm seal for maintaining constant the volume above said diaphragm seal.

6. Apparatus according to claim 5 wherein said ring permits gas flow only toward said compression space from said gas space above the diaphragm.

7. Apparatus according to claim 5 wherein said ring permits gas flow only toward said gas space above the diaphragm seal from said compression space.

8. Apparatus according to claim 5 wherein said piston includes a circumferential groove therein, said sealing ring is disposed within said groove with an annular space defined between the inside diameter surface of the ring and the adjacent surface of the groove.

9. Apparatus according to claim 8 wherein said piston includes internal duct means connecting said groove with a surface of the piston partially defining said compression space.

10. Apparatus according to claim 5 wherein said ring has at least one radial extending groove on a surface facing one of said compression and said gas spaces, said grooves permitting gas to flow past the ring in only one axial direction of the apparatus.

11. Apparatus according to claim 5 wherein the housing further comprises a buffer chamber intermediate said ring seal and said compression space, this chamber defined by the housing and a portion of the piston intermediate the ring seal and the end thereof defining the compression space, said buffer space having therein working medium at the same pressure as said working space, and the buffer space in open communication with said ring seal.

* * * * *

PO-1050
(5/69)

UNITED STATES PATENT OFFICE
CERTIFICATE OF CORRECTION

Patent No. 3,667,348          Dated     June 6, 1972

Inventor(s) GREGORIUS THEODORUS MARIA NEELEN

It is certified that error appears in the above-identified patent and that said Letters Patent are hereby corrected as shown below:

Claim 1 should read as follows:

1. In an apparatus having two elements which are coaxially disposed and relatively movable within a housing, a rolling diaphragm seal which is secured between adjacent walls of these elements and defines and separates a first space for containing gas and a second space for containing liquid for supporting the diaphragm, the housing including a third space having compressed gas therein, and control means operative with said apparatus for maintaining at least a substantially constant pressure differential across the diaphragm, the improvement in combination therewith comprising a second seal between said elements and axially spaced from said diaphragm, with said first space situated between said diaphragm and second seal and said third space on the remote side of said second seal, the second seal having a diameter which is equal to the effective diameter of the diaphragm.

Signed and sealed this 17th day of April 1973.

(SEAL)
Attest:

EDWARD M. FLETCHER, JR.          ROBERT GOTTSCHALK
Attesting Officer          Commissioner of Patents